United States Patent [19]

Pyle

[11] 4,425,598

[45] Jan. 10, 1984

[54] ELECTRIC POWER DISTRIBUTION PANEL

[76] Inventor: Larry J. Pyle, 33 Scenic Dr., Napa, Calif. 94558

[21] Appl. No.: 271,510

[22] Filed: Jun. 8, 1981

[51] Int. Cl.³ .............................................. H02B 1/04
[52] U.S. Cl. ................................... 361/361; 361/341; 361/358; 174/52 R
[58] Field of Search ............... 361/358, 359, 363, 340, 361/341, 342, 390, 391, 360, 361, 362, 334, 331, 346, 380, 355, 417, 419, 429; 174/52 R, 59

[56] References Cited

U.S. PATENT DOCUMENTS

| | | | |
|---|---|---|---|
| D. 222,362 | 10/1971 | Williams | D26/15 |
| 1,878,335 | 9/1932 | Shull | 361/359 |
| 2,457,347 | 12/1948 | Casler et al. | 174/52 R |
| 3,107,132 | 3/1959 | Smith | 339/60 |
| 3,343,041 | 8/1966 | Pistey et al. | 317/99 |
| 3,445,585 | 12/1967 | Meisel et al. | 174/59 |

FOREIGN PATENT DOCUMENTS 541655  5/1957  Canada ............................... 361/358

*Primary Examiner*—G. P. Tolin

[57] ABSTRACT

An electric power distribution panel having a container with an open portion. The container includes a number of openings through the same for the mounting of electrical receptacles. At least one member spans the opposing wall portions of the container and supports a tray above the same. The cover encloses the open portion of the container. The cover includes an opening having a door which lies over the tray within the container.

7 Claims, 5 Drawing Figures

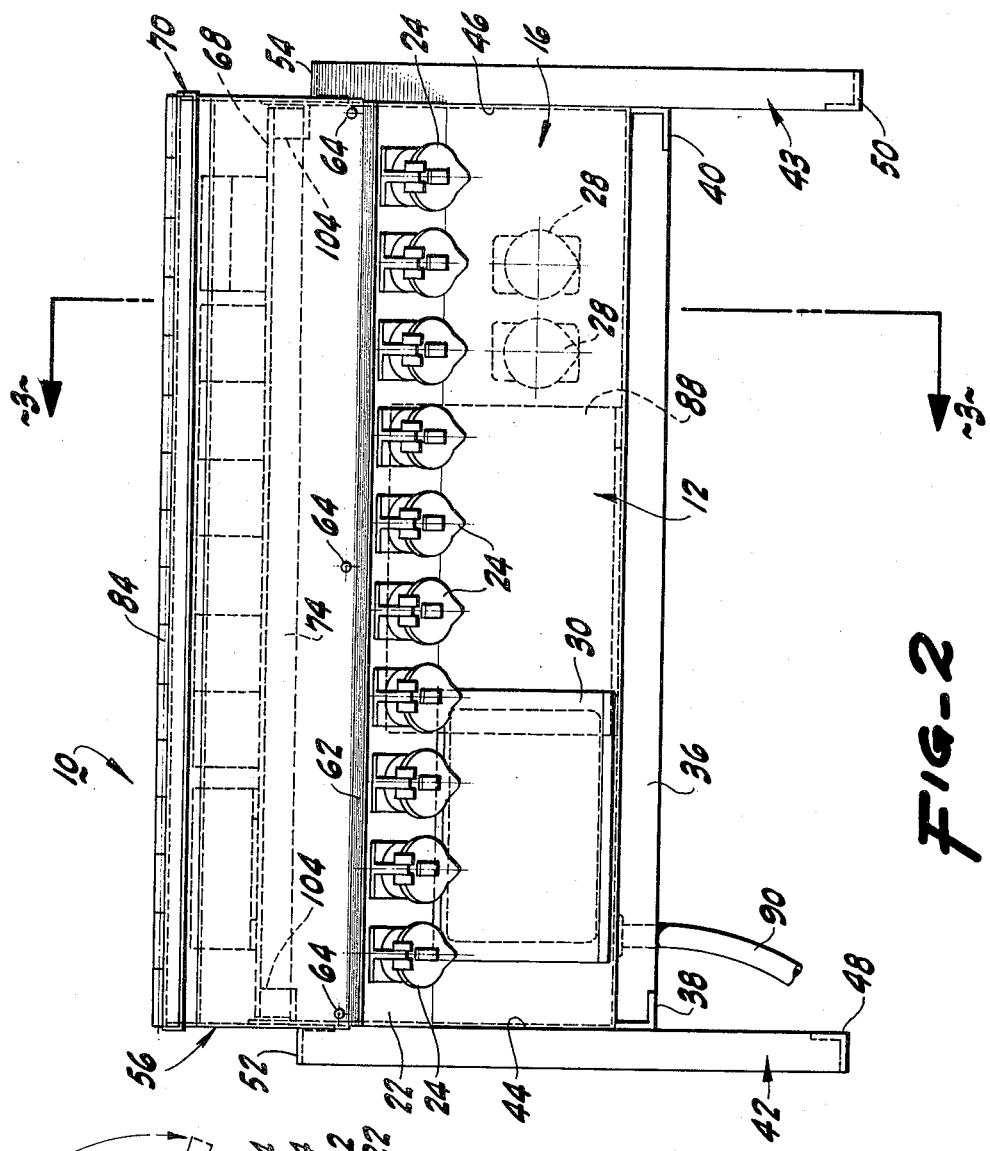
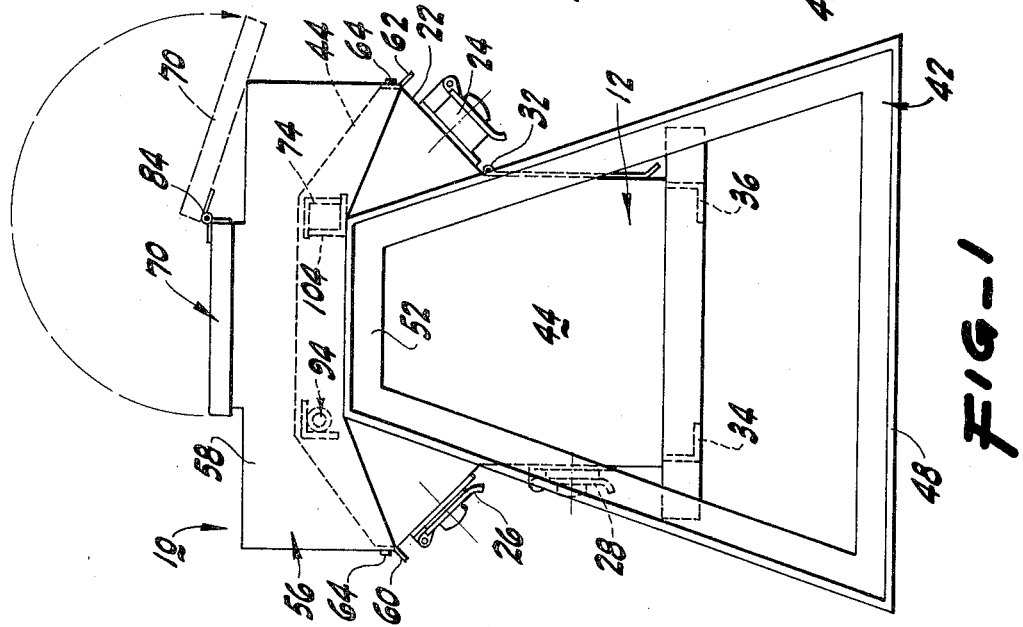

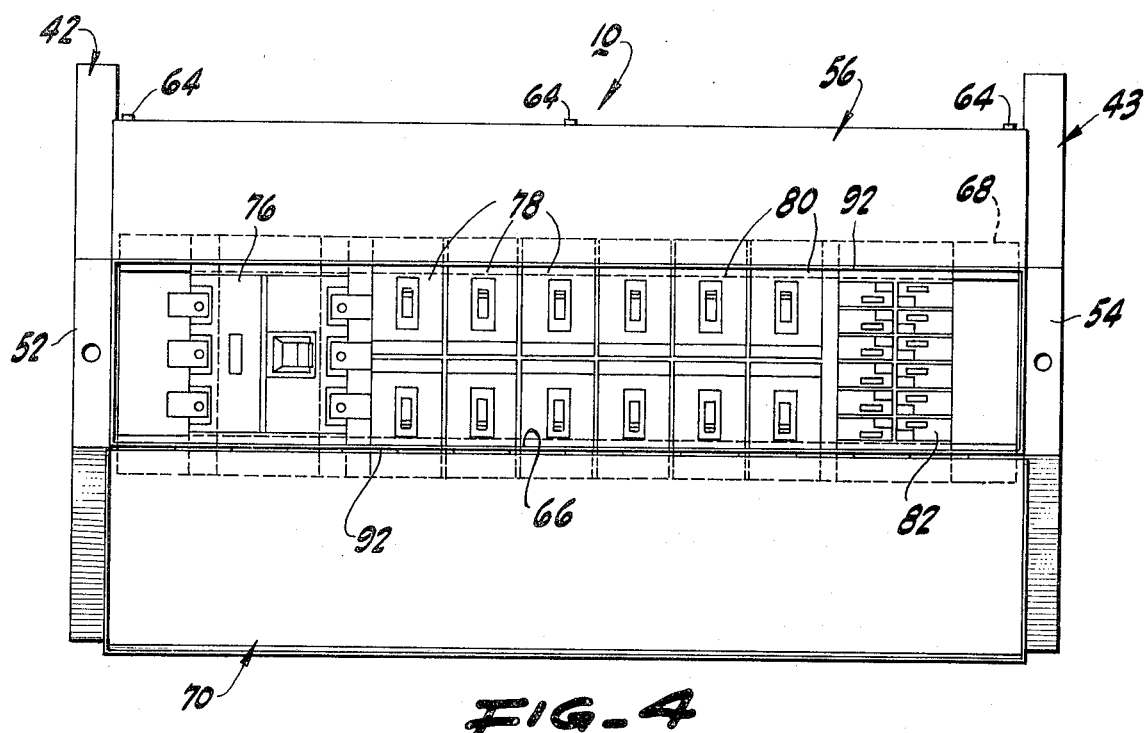
FIG-4
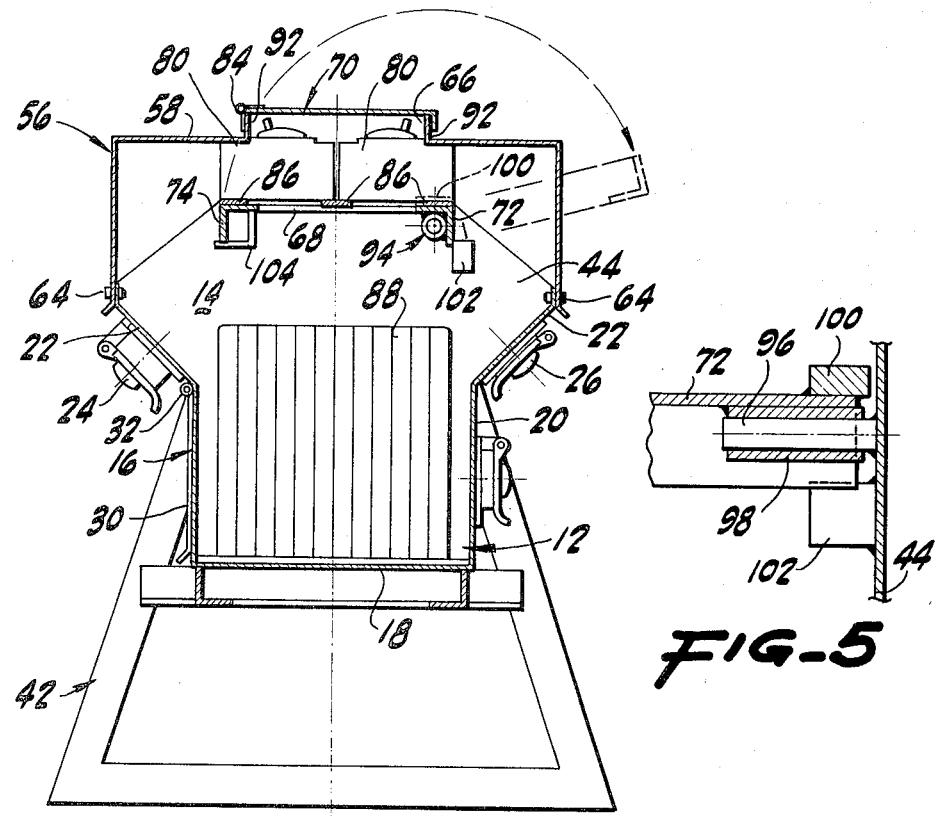
FIG-5
FIG-3

ELECTRIC POWER DISTRIBUTION PANEL

BACKGROUND OF THE INVENTION

The present invention relates to a novel electric power distribution panel which is particularly useful for providing electrical power in an industrial area for welding, lighting, and the like.

Electric power distribution panels have been used for a number of years in situations requiring a variety of electrical power supplies in various areas where permanent power installations are not available. For example, multiple welding systems require such electrical distribution devices. In this regard, reference is made to U.S. Pat. No. 3,107,132 where a type of electrical distribution device is shown in its conventional form. U.S. Pat. No. 3,343,041 describes another electrical power center which is intended to be constructed of corrsion resistant material. U.S. Pat. No. DES. 222,362 shows another electric power distribution apparatus which uses supports to raise the central distributing portion of the same above the ground surface. All the prior devices, although ruggedly built, are difficult to repair since access is severely limited by the structure.

It would be an advance in the art if an electric power panel could be devised which would exhibit the strength characteristic of the prior art and yet be fully accessible for maintenance repair and alteration of the same.

SUMMARY OF THE INVENTION

In accordance with the present invention a novel and useful electric power distribution panel is provided to solve the problems encountered by the prior art devices.

The electric power distribution panel of the present invention employs a container having an open portion between opposing side wall portions thereof. The container also further includes a plurality of receptacle openings which pass through the container. At least one members spans the opposing side wall portions and are supported by the container. Such support may be obtained by welding or by the use of fasteners. A tray is placed adjacent to the spanning member such that it gains support from the same. In one embodiment of the invention, the container may be formed such that it includes a lower section having substantially vertical walls and an upper section having outwardly angled walls. The receptacle openings would be positioned in the vertical and outwardly angled wall portions as desired.

The electric power distribution panel also embraces means for covering the open portion of the container. the covering means may itself include an opening which is positioned over the tray supported by the container. Door means may be provided for closing the opening of the covering means against the elements. The covering means may also include a flange which surrounds the opening of the covering means such that the door means is connected to the flange. Thus, where the tray is used to hold circuit breakers, the door permits access to the same. The electrical bus bar can be located totally within the container beneath the tray portion. Further, means may be provided for pivoting the tray in relation to the container. Such a feature lends access to the portion of the container beneath the tray where a transformer generally positions. The bus bar would be provided with flexible fittings to permit such rotation or pivoting. In addition, the cover means may be completely removable from the container and include an access door to the interior thereof. The bottom portion of the tray may be reached by including means for pivoting at least one of the members spanning the opposing sidewall portions of the container. The pivoting means may take the form of a pair of concentric pipes, one of which is fixed to the container and the other to the cover means. Stops may be provided on the container to provide the tray with a level configuration.

It may be apparent that a novel and useful electric power distribution panel has been described.

It is therefore an object of the present invention to provide an electric power distribution panel which is easily moved from place to place and includes means for providing complete access to the interior thereof for the purposes of maintenance, repair, and alteration of the same.

It is another object of the present invention to provide an electric power distribution panel which protects the receptacles from the elements and is better protected from damage by vehicles such as forklifts than any of the electric power panels of the prior art.

It is still another object of the present invention to provide an electric power distribution panel which permits the easy access to the transformer section thereof and includes a circuit breaker section which pivotally attaches to the body of the panel.

It is yet another object of the present invention to provide an electrical power distribution panel which may be sized to provide a convenient stacking arrangement on a typical truck bed during transportation of a multiplicity of the power panels.

The invention possesses other objects and advantages especially as concerns particular characteristics and features thereof which will become apparent as the specification continues.

BRIEF DESCRIPTION OF THE DRAWINGS

FIG. 1 is an end elevational view of the panel of the present invention.

FIG. 2 is a side elevational view of the panel of the present invention.

FIG. 3 is a view taken along line 3—3 of FIG. 2.

FIG. 4 is a top plan view of the panel of the present invention.

FIG. 5 is an enlarged sectional view showing the pivoting mechanism of the tray portion of the present invention.

For a better understanding of the invention references is made to the following detailed description which should be referenced to the hereinabove described drawings.

DESCRIPTION OF THE PREFERRED EMBODIMENTS

Various aspects of the present invention will evolve from the following detailed description of the preferred embodiments thereof which should be taken in conjunction with the hereinabove described drawings.

The invention as a whole is represented in the drawings by reference character 10. The electric power distribution panel 10 includes a container 12, FIG. 3, which has a containing space 14 between side portions 16 and bottom 18. Side walls 16 includes substantially vertical walls 20 at the lower portion and outwardly angled walls 22 at the upper section thereof. A plurality of receptacles 24 and 26 are placed in a plurality of openings through angled wall portions 22. Thus, receptacles 24 and 26, which may be used to supply 480 V and 120 V AC power, are generally protected from the elements. Further, a plurality of receptacles 28 are positioned within a plurality of openings in vertical walls 16. Receptacles 28 may provide 240 V AC power. It should be noted that receptacles 28 lie in the shadow of angled wall 22, thus being weather protected to a certain extent, FIGS. 1 and 3. Access door 30 located in vertical wall 20 opens about hinge 32, permitting the user to reach the interior space 14 of container 12.

With reference to FIGS. 1 and 2, it may be seen that container 12 fits atop L-bars 34 and 36 which run the length of container 12. The bottom 18 of container 12 may be welded or otherwise fastened to L-bars 34 and 36. L-bars 38 and 40 support L-bars 34 and 36 and are placed at approximately right angles to one another. L-bar 38 spans a trapezoidal shaped leg 42 while L-bar 40 spans trapezoidal leg 43. Legs 42 and 43 are connected to L-bars 38 and 40 and may be also fastened by welding, and the like, to end vertical walls 44 and 46 of container 12. Legs 42 and 43 are sized such that a duplicate electric power distribution panel 10 may be stacked on top of the panel shown in the drawings for storage and transportation. The bottom members 48 and 50 of legs 42 and 43 would fit on horizontal top members such as members 52 and 54 depicted in FIG. 2. A fastener such as a bolt may be passed through both bottom and top members and held in place with a nut, not shown.

Panel 10 also includes as one of its elements means 56 for covering open containing space 14. Means 56 may include a top 58 which overlaps end walls 44 and 46 and abutts angled walls 22 of container 12. Top 58 may include flared edge portions 60 and 62 which aids in the weather protection of receptacles 24, 26, and 28. A multiplicity of fasteners 64 removably holds top 58 to container 12. Top 58 includes an opening 66, FIG. 3, which positions over a tray 68. Tray 68 is supported by members 72 and 74 which are welded or otherwise fastened to end walls 44 and 46. Tray 68 serves as a mounting means for circuit breaker 76, the main circuit breaker for the 480 V, 400 amp power, a plurality of 480 V-50 amp circuit breakers 78, a pair of 240 V-30 amp circuit breakers 80, and a multiplicity of 120 V-20 amp circuit breakers 82, best shown on FIG. 4. Thus, the opening of door means 70 permits ready access to the circuit breakers hereinabove described. As shown on FIG. 2, door means 70 may include a hinge 84 to aid in the rotation of the same. Bus bars 86, FIG. 3, serves to carry the electrical load from transformer 88. Transformer 88 may be typically rated at 15 kilowatts, 480/120 V. Power cable 90 could supply 480 V-3 phase-60 hertz power from a source of electrical energy, not shown. Top 58 also includes a flange portion 92 which surrounds opening 66, functioning to provide the clearance necessary for the circuit breakers.

The electrical power distribution panel may also include means 94 for pivoting tray 68. Means 94 may include a pair of bosses such as boss 96 illustrated in FIG. 5. It should be noted that the mechanism shown in FIG. 5 would be duplicated on either end of tray 68. As shown, boss 96 is surrounded by a pipe 98 which is fastened to member 72. A bar 100 is fastened to the top portion of member 72 and is sized to block 102 which is fastened to end walls 44 and 46. Thus, bar 100 acting in conjunction with block 102 serves as a stop for tray 68 when it is rotated upwardly. Further, tray 68, which is fastened to spanning member 74, is stopped from rotating downwardly by L-bar 104, FIG. 3. The rotation of tray upwardly again permits ready access to the interior containing space 14 of container 12. The components of electric power distribution panel such as the container 12, legs 42 and 43, and tray 56, may be constructed of sheet metal or other suitable material.

In operation, the user places transformer 88 within space 14 of container 12. Receptacles 24, 26, and 28 are placed in the openings found within the vertical and angled walls 20 and 22 of container 12. Circuit breakers 76, 78, 80 and 82 are placed within tray 68 located above transformer 88. Electrical hookups are easily accomplished by opening access door 30 and/or rotating tray 68 by the use of pivoting means 94. In subsequent operation, door 70 may be opened to activate any of the circuit breakers as desired. When electrical power distribution panel 10 requires repair of maintenance, door means 70, pivoting means 94, and the opening of access door 30 may facilitate such work.

While in the foregoing embodiments of the invention have been set forth in considerable detail for the purposes of making a complete disclosure of the invention, it may be apparent to those of ordinary skill in the art that numerous changes may be made in such details without departing from the spirit and principles of the invention.

What is claimed is:

1. A portable electric power distribution panel including a transformer comprising:
   a. a container having an open portion between a bottom and opposing side wall portions, said container further including a plurality of receptacle openings; through said side wall portions, said container defined to at least enclose the transformer;
   b. at least one member spanning said opposing side wall portions and being supported by said container;
   c. a tray being placed adjacent to and being supported by said at least one member spanning said opposing wall portions; the transformer being positioned between said container bottom and said tray;
   d. at least one bus bar located beneath said tray and adjacent said at least one member spanning said opposing side wall portions;
   e. means for pivoting said tray and at least one bus bar in relation to said container including means for pivotally connecting said at least one member spanning said opposing wall portions to said container;
   f. means for covering said open portion of said container, said covering means including an opening being positioned over said tray and door means for closing said covering means opening.

2. The electric power distribution panel of claim 1 which additionally comprises a flange connected to said covering means and surrounding said opening of said covering means, said door means being connected to said flange.

3. The electric power distribution panel of said claim 2 in which said container includes a lower section having substantially a vertical wall portion and an upper section having an outwardly angled wall portion, said receptacle openings being positioned in said vertical and outwardly angled wall portions.

4. The electric power distribution panel of claim 3 which additionally comprises means for pivoting said tray in relation to said container.

5. The electric power distribution panel of claim 4 in which said at least one member spanning said opposing side wall portions of said container comprises first and second members spanning said opposing side wall portions of said container.

6. The electric power distribution panel of claim 5 in which said means for pivoting said tray in relation to said container comprises means for pivotally connecting said at least one member spanning said opposing wall portions to said container.

7. The electric power distribution panel of claim 6 in which said means for pivotally connecting said at least one member spanning said opposing wall portions includes a pair of bosses fixed to said opposing wall portions and a pair of hollow members fixed to said tray and superimposed in relation to said bosses.

* * * * *